Figure 1:
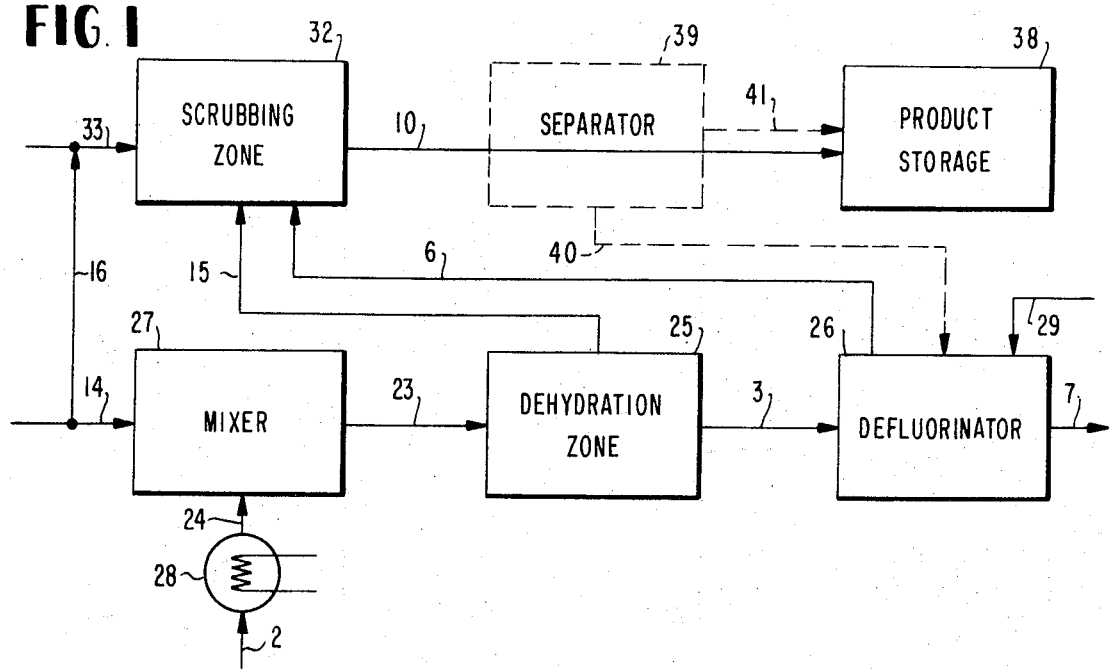

United States Patent

Parish et al.

[15] 3,645,678
[45] Feb. 29, 1972

[54] CONCENTRATING FLUOSILICIC ACID

[72] Inventors: William R. Parish; James C. Kelley, both of Lakeland, Fla.

[73] Assignee: Wellman-Lord, Inc.

[22] Filed: Mar. 9, 1970

[21] Appl. No.: 17,580

[52] U.S. Cl. ................................23/153, 23/167, 23/182, 23/205
[51] Int. Cl. ................C01b 7/22, C01b 33/08, C01b 33/00
[58] Field of Search ...........................23/153, 205, 182, 167

[56] References Cited

UNITED STATES PATENTS

| | | | |
|---|---|---|---|
| 3,218,124 | 11/1965 | Oakley, Jr. et al. | 23/153 |
| 3,218,126 | 11/1965 | Wilkinson | 23/153 |
| 3,218,128 | 11/1965 | Klem | 23/153 |
| 1,960,347 | 5/1934 | Osswald et al. | 23/153 |
| 2,456,509 | 12/1948 | Hopkins, Jr. et al. | 23/153 |
| 3,415,039 | 12/1968 | Rushton et al. | 23/153 X |
| 3,233,969 | 2/1966 | Heller et al. | 23/182 |
| 3,218,125 | 11/1965 | Houston et al. | 23/153 |

Primary Examiner—Edward Stern
Attorney—Morton, Bernard, Brown, Roberts & Sutherland, John W. Behringer, Martin J. Brown, W. Brown Morton, Jr., Eugene L. Bernard, James N. Dresser, John T. Roberts and Malcolm L. Sutherland

[57] ABSTRACT

A process for the concentration of aqueous fluosilicic acid solutions is disclosed. In the process, a dilute aqueous fluosilicic acid solution is premixed with concentrated sulfuric acid under superatmospheric pressure and elevated temperatures; the mixture is introduced to a reduced pressure, high-temperature dehydration zone to release a gaseous overhead containing essentially all of the silicon tetrafluoride and a liquid sulfuric acid bottoms; the gaseous overhead is passed to a scrubbing zone to effect reaction of the silicon tetrafluoride with the water content of a dilute aqueous fluosilicic acid solution and thereby concentrate the fluosilicic acid content therein and the concentrated fluosilicic acid solution is then recovered. Advantageously, the diluted sulfuric acid bottoms can be contacted with a siliceous material to convert any contained hydrogen fluoride to another silicon tetrafluoride-containing gaseous overhead which is also passed to the scrubbing zone to effect further concentration. Hydrogen fluoride may also be recovered in pure form in a particular embodiment.

21 Claims, 2 Drawing Figures

INVENTORS
WILLIAM R. PARISH
JAMES C. KELLEY

BY *McLean, Morton & Boustead*

ATTORNEYS

CONCENTRATING FLUOSILICIC ACID

Other applications, commonly owned herewith, concerning processes of treating fluosilicic acid are U.S. Ser. No. 812,229, filed Apr. 15, 1969; U.S. Ser. No. 17,590, filed Mar. 9, 1970; and U.S. Ser. No. 17,611, filed Mar. 9, 1970.

This invention relates to a process for the concentration of dilute aqueous solutions of fluosilicic acid by dehydration with concentrated sulfuric acid to prepare concentrated aqueous solutions of fluosilicic acid. Diluted sulfuric acid suitable for phosphoric acid manufacture is also produced and, in a particular embodiment, hydrogen fluoride may also be recovered.

The process of the present invention involves mixing strong sulfuric acid, including oleum, having a concentration generally of at least about 85, say about 85 to 100, preferably about 90 to 99, weight percent of sulfuric acid with dilute aqueous solutions of fluosilicic acid having a composition ranging normally from 10 to 30 weight percent $H_2SiF_6$ and 70 to 90 weight percent water. Dilute aqueous fluosilicic acid solutions containing from about 10 to 30 weight percent $H_2SiF_6$ and 70 to 90 weight percent water are normally produced as a byproduct in phosphoric acid manufacture. Preferably, the sulfuric acid and dilute aqueous fluosilicic acid are each preheated to about 90° to 240° F., prior to their being admixed together. The weight ratio of the acids is such that the spent acid mixture, after the separation step described hereinafter, has a sulfuric acid concentration of at least about 70 weight percent and advantageously about 70 to 95 weight percent. The weight ratio on an anhydrous basis is thus normally at least 5 to about 30 parts, preferably about 15 to 20 parts, sulfuric acid per part of fluosilicic acid.

The mixing of the two acids is carried out under superatmospheric pressure for a time to allow substantially complete mixing of the acids. The temperature of the mixture can range from ambient temperatures up to about 350° F. At temperatures about about 350° F., the construction of suitable apparatus becomes difficult from a materials standpoint. Preferably, the temperature of the mixture will reach the temperature of the liquid in the dehydration zone, which is hereinafter discussed. The time required for the acid mixture to reach a suitable temperature will often be about 0.1 to 10 seconds or more. The amount of pressure employed is at least that which is sufficient to prevent the water in the acid mixture from reacting with the silicic component to produce silicon dioxide, commonly referred to as "silica." For example, at about atmospheric pressure and elevated temperatures comparable to those herein, $SiF_4$ (from the fluosilicic acid) and water can react to form silica. The formation of silica is essentially avoided in the process of the present invention by maintaining the pressure above atmospheric, e.g., at least about 5 pounds per square inch gauge (p.s.i.) and preferably at least about 10 or 15 p.s.i.g.

The pressurized mixture of the sulfuric acid and fluosilicic acid is next introduced into a separation zone maintained at lower pressure than the mixing zone, whereby a gaseous overhead is evolved and liquid bottoms are formed. The temperature of the liquid in the separation zone is normally about ambient to 325° F., and thus is below the boiling point of the sulfuric acid in the zone. The pressure in the separation zone is sufficiently below that of the pressurized mixture zone so as to allow gas-liquid separation. Atmospheric pressure is normally advantageous. The gaseous overhead produced in the separation zone contains essentially all of the silicon tetrafluoride produced from the mixing of the sulfuric and fluosilicic acids. The gaseous overhead also can contain hydrogen fluoride in an amount ranging from a very minor amount, e.g., essentially nil, to essentially all of the hydrogen fluoride produced from the admixing of the acids. The amount of hydrogen fluoride present in the gaseous overhead is predominantly dependent upon the temperature of the liquid in the separation zone. At temperatures within the lower portion of the range described hereinbefore, i.e., up to about 250° F., essentially all or at least a substantial portion of the hydrogen fluoride is present in the dilute sulfuric acid bottoms, while at temperatures within the upper portion of that range, i.e., between about 250° to 350° F., most or significant amounts of the hydrogen fluoride is present in the gaseous overhead. The amount of hydrogen fluoride liberated in the gaseous overhead is not particularly significant to the operation of the overall concentration process of this invention; however, more specific embodiments described hereinafter may require minor or major portions of hydrogen fluoride in the gaseous overhead.

The separation zone is preferably one which allows the mixture to be sufficiently dispersed such that it has at least about one, preferably at least about 20, or even at least about 40, square centimeters of liquid gas interface per cubic centimeter of liquid. In other words, the vessel which houses the separation zone is one which provides a large surface area for the liquid, examples of such being spray towers, falling film evaporators, wiped film evaporators, forced circulation evaporators or any highly agitated vessel. In a falling film evaporator, for instance, there can often be obtained about 20 to 40 square centimeters of liquid gas interface per cubic centimeter of liquid.

The desired temperature can usually be maintained in the separation zone without the application of external heat. As mentioned above, it is preferred that the entering mixture of acids already be up to the desired separation zone temperature. The temperature of the zone's contents depends mainly upon the inlet temperatures of both solutions, the heat of dilution of sulfuric acid and the heat of vaporization of the $SiF_4$ gas. The heat of vaporization of the $SiF_4$ gas tends to counterbalance the heat of dilution of the sulfuric acid. By preheating either or both acids and by maintaining them in pressurized admixture with one another for a sufficiently long time, the objective of bringing them up to separation zone temperatures is greatly facilitated.

The residence time of the mixture in the separation zone is relatively short, ranging, for example, from about 0.1 minute to about 80 minutes, preferably about 0.5 to 5 minutes. The fluosilicic acid is dehydrated during the time beginning with its admixture with the concentrated sulfuric acid and extending to its residence in the separation zone, and the sulfuric acid is correspondingly diluted. Hydrogen fluoride and silicon tetrafluoride and water are the products of the dehydration of fluosilicic acid. As noted before, silicon tetrafluoride exits the separation zone as substantially anhydrous gaseous overhead. The hydrogen fluoride remains in solution or can also be removed as gaseous overhead, depending on the temperature in the separation zone. The diluted sulfuric acid is withdrawn from the separation zone as liquid bottoms, for example, having a sulfuric acid content of at least about 70, often about 70 to 95, percent, based on the combined weight of water and sulfuric acid. This concentration can be controlled by adjusting the ratio of the sulfuric acid to the fluosilicic acid in the pressurized mixture introduced to the separation zone.

The diluted sulfuric acid bottoms from the separation zone will contain from a very minor amount of hydrogen fluoride, say about 1 percent of the total amount produced during the dehydration, to essentially all, say about 99 percent of the total amount produced during dehydration. Dilute sulfuric acid bottoms which contain hydrogen fluoride are passed to a spent acid hold tank and maintained at a temperature below the boiling point of the sulfuric acid, normally within the range of about 100° to 300° F., at essentially atmospheric pressure. In the hold tank, the dilute sulfuric acid bottoms may be treated with a siliceous material such as sand, precipitated silica, or diatomaceous earth, advantageously under turbulent conditions, to convert any hydrogen fluoride present in the bottoms to silicon tetrafluoride, which, due to its low solubility in the dilute sulfuric acid bottoms, is evolved therefrom as a gas. The amount of silica added to the spent acid hold tank is preferably at least about stoichiometric to the amount of HF in the sulfuric acid.

The amount of sulfuric acid in the dilute sulfuric acid bottoms is advantageously above about 65 percent, based on the combined weight of water and sulfuric acid. Above about 65 weight percent sulfuric acid, the subsequent silica treatment gives silicon tetrafluoride as the product, as follows:

1. $4HF + SiO_2 \rightarrow SiF_4 + 2H_2O$

However, below about 65 weight percent sulfuric acid, the reaction proceeds as follows:

2. $6HF + SiO_2 \rightarrow H_2SiF_6 + 2H_2O$

Thus, the concentration of the sulfuric acid in the sulfuric acid bottoms to be silica-treated should advantageously be above about 65 weight percent, preferably above about 70 weight percent, so that silicon tetrafluoride is produced. The silicon tetrafluoride is removed as a gaseous overhead; this product is then directly converted into fluosilicic acid in the scrubbing or concentration zone described hereinafter.

The fluorine level present in the dilute sulfuric acid bottoms after silica treatment is normally less than about 0.2 percent by weight. This low fluorine, dilute sulfuric acid bottoms can be useful in phosphoric acid manufacture and sometimes may also be admixed with concentrated sulfuric acid to form a suitable sulfuric acid feed for the present concentration process.

The gaseous overhead from the separation zone, containing essentially all of the silicon tetrafluoride from the dehydration of the fluosilicic acid feed, and, optionally, the gaseous overhead from the spent acid hold tank produced by the dehydrofluorination, if any, of the diluted sulfuric acid bottoms from the separation zone, are contacted with a wash liquid of dilute, aqueous fluosilicic acid solution in the scrubbing zone. The fluosilicic acid wash solution may advantageously be of the same composition as previously described for the feed in the process of this invention. In the scrubbing zone, the silicon tetrafluoride in the gaseous overheads reacts with water to form fluosilicic acid and silica, which may or may not precipitate, depending upon the hydrogen fluoride content of the gaseous overhead from the separation zone. The reactions in the scrubbing zone will be described in greater detail hereinafter.

The scrubbing zone serves to concentrate the fluosilicic acid content of the scrubbing solution. Depending upon the concentration of hydrogen fluoride in the gaseous overhead, the concentrating is accomplished by the occurrence of the following reactions in varying degrees:

3. $3SiF_4 + 2H_2O \rightarrow 2H_2SiF_6 + SiO_2$
4. $6HF + SiO_2 \rightarrow H_2SiF_6 + 2H_2O$
5. $4HF + SiO_2 \rightarrow SiF_4 + 2H_2O$
6. $2H + SiF_4 \rightarrow H_2SiF_6$ Furthermore, depending upon the hydrogen fluoride content of the overhead, silica may or may not precipitate in the hydration zone, as mentioned hereinbefore.

The scrubbing zone is normally maintained within the temperature range of about 75° to 150° F., preferably below about 120° F. The scrubbing zone can be supplied by any suitable gas-liquid contacting vessel as, for example, one or more spray towers. Additionally, any silicon tetrafluoride gas passing through the scrubbing zone unreacted may be routed to a second such scrubbing zone to reduce $SiF_4$ losses.

If the hydrogen fluoride content of the overhead from the dehydration zone is not sufficient to convert essentially all of the silica formed in the scrubbing zone to $SiF_4$, then the concentrated fluosilicic acid leaving the scrubbing zone may be treated to remove the precipitated silica content. The separation of the silica from the fluosilicic acid product is accomplished in a silica separation zone by, for example, centrifugation, filtration or decantation. The separated silica may then optionally be washed to remove absorbed, concentrated fluosilicic acid. The washing is normally accomplished by treatment with weak fluosilicic acid; preferably, the weak fluosilicic acid solution entering the initial scrubbing zone is used. Also, the separated silica, washed or unwashed, may be then used in the silica treatment of the diluted sulfuric acid bottoms in the hold tank to transform hydrogen fluoride to silicon tetrafluoride.

The fluosilicic acid solution removed from the scrubbing zone, or, if utilized, from the silica separation zone, is the concentrated fluosilicic acid product of this invention. The concentrated product usually is at a temperature of about 75° to 125° F., and normally about 90° to 100° F. This product is then passed to a suitable storage zone. The concentrated fluosilicic acid solution prepared by the process of this invention has a fluosilicic acid content ranging from about 20 to more than about 70 percent by weight, depending upon the particular feed, scrubbing solution used, and other process variables. The fluosilicic acid concentration of the concentrated solution product is always higher than the fluosilicic acid concentration of the dilute solution feed. Normally, the product will have a fluosilicic acid content of from about 40 to 60 percent by weight.

In an alternative embodiment, hydrogen fluoride, as well as the concentrated fluosilicic acid, can be recovered as a product of the process of this invention. In this embodiment, the gaseous overhead from the dehydration zone contains recoverable amounts of hydrogen fluoride as well as silicon tetrafluoride, and this overhead is treated in an HF absorption zone to remove hydrogen fluoride prior to passage of the silicon tetrafluoride to the scrubbing zone. In the absorption zone, the gaseous overhead from the separation zone is contacted with liquid sulfuric acid having a concentration of about 93 to 99, preferably about 98 to 99, weight percent and at temperatures up to about 120° F., often about 90° to 100° F., to selectively absorb the HF. Any suitable gas-liquid contacting vessel can be employed. The vessel is preferably one in which the gaseous overhead is passed upwardly through a descending stream of the concentrated sulfuric acid, e.g., in a packed tower, sieve tray column, bubble-capped column, spray tower, etc. Silicon tetrafluoride passes through the sulfuric acid without being absorbed. Preferably, there is employed sufficient sulfuric acid in this absorption step to absorb at least about 80, most preferably at least about 90, percent of the HF in the overhead stream from the separation zone. Much less sulfuric acid is required to accomplish this than is needed to dehydrate the fluosilicic acid as described above. Thus, for example, of the total amount of concentrated sulfuric acid used in the two steps, usually only about 1 to 10, e.g., about 5 percent, will be used in the HF absorption step. The spent sulfuric acid obtained from the absorption step will often contain about 2 to 40, usually about 10 to 20, weight percent of dissolved HF.

The HF-containing sulfuric acid from the above absorption step is then conducted to a desorption zone wherein it is heated to a temperature sufficient to liberate gaseous hydrogen fluoride therefrom, but below the boiling point of the solution in the zone; often, for example, a temperature of about 200° to 300° F. will be suitable, especially at approximately atmospheric pressure. The HF which is recovered thereby can be about 98 to 99 percent pure. To purify it further, say to about 99.8 percent purity, it can be rectified. An advantage of rectifying the HF at this point in the process rather than condensing the HF while admixed with the $SiF_4$ in the overhead from the separation zone, is that 98 percent pure HF condenses about 68° F. at atmospheric pressure, whereas the $HF/SiF_4$ overhead mixture would have to be cooled to about minus 55° F. in order to condense the HF therefrom.

The hydrogen-fluoride-desorbed sulfuric acid can be passed to the spent acid holding tank where it is mixed with the dilute sulfuric acid bottoms from the dehydration zone. The resultant acid mixture can be treated with a siliceous material, as described before, for the production of $SiF_4$ from any HF present.

The process of the instant invention can be more readily described by reference to the drawings in which FIG. 1 sets forth a flowsheet illustrating one embodiment of the invention, and FIG. 2 sets forth an alternative embodiment of the invention.

Referring to FIG. 1, fluosilicic acid, at a temperature of about 90° to 240° F. and a concentration of from about 10 to 30 weight percent $H_2SiF_6$, is carried in line 14 to mixing tee 27 where it is combined with 85 to 100 percent sulfuric acid introduced via line 2, heater 28 and line 24, also at a temperature of from about 90° to 240° F. The weight ratio (anhydrous) of sulfuric acid to fluosilicic acid in the mixture is from about 5:1 to 30:1. The mixture of acids is conducted via line 23 under about 5 to 15 p.s.i.g. pressure to the dehydrator 25, which can be a falling film type of evaporator. Residence time in line 23 is about 5 seconds and the mixture enters the evaporator at about 200° to 300° F., which is approximately the temperature of the liquid in the evaporator. $SiF_4$ gas flashes off under the approximately atmospheric pressure conditions maintained in the evaporator and is removed via line 15. Diluted sulfuric acid (about 80 to 85 weight percent concentration) is withdrawn as bottoms via line 3. Residence time of the reactants in the evaporator is about 2 to 5 minutes.

The dilute sulfuric acid bottoms in line 3 are passed to the spent acid hold tank 26 in which the acid is treated with a siliceous material, such as sand, introduced through line 29. The silica-treated acid mixture is maintained under turbulent conditions, as by a stirrer (not shown), at a temperature of from about 200° to 300° F. and at essentially atmospheric pressure. The silica reacts with any hydrogen fluoride present to produce silicon tetrafluoride which is removed as gaseous overhead through line 6. The amount of silica introduced is at least about stoichiometric to the amount of HF in the dilute sulfuric acid bottoms. The silica-treated dilute sulfuric acid of a concentration of about 80 to 85 weight percent can be removed through line 7 for ultimate recovery.

The gaseous overheads from the separation zone 25 in line 15 and spent acid hold tank 26 in line 6 are passed into scrubbing zone 32 where they are contacted with dilute, aqueous fluosilicic acid wash liquid supplied through line 33. The wash liquid is preferably of the same concentration as the dilute fluosilicic acid solution feedstock 14 and can be taken off line 14 through line 16. The gaseous overhead from scrubbing zone 32, which may contain some unreacted $SiF_4$, can be passed into a second such scrubbing zone (not shown) to reduce $SiF_4$ losses.

The concentrated fluosilicic acid solution, of a concentration of from about 20 to 70, preferably 40 to 50, weight percent fluosilicic acid, is removed from scrubbing zone 32 through line 10 to concentrated acid storage tank 38.

In an optional embodiment, shown by broken lines in the drawing, in which the HF content of the overhead from the dehydration zone 25 and the scrubbing liquid is not sufficient to consume the silica formed in the scrubbing zone 32, the concentrated fluosilicic acid product leaving the scrubbing zone 32 through line 10 is conveyed to a silica separation zone 39 where the silica is removed from the concentrated fluosilicic acid. The silica separation zone 39 can contain suitable filtering, centrifuging or decantation apparatus. The separated silica can be passed through line 40 to spent acid holding tank 26 as part of the silica charge to the dilute sulfuric acid bottoms. The separated silica can also, if desired, be washed with a suitable wash liquid, such as the dilute fluosilicic acid feed solution, to remove absorbed, concentrated fluosilicic acid product solution before being introduced into the spent acid holding tank 26. The silica-removed, concentrated fluosilicic acid product can be conveyed to storage tank 38 through line 41.

Figure 2:
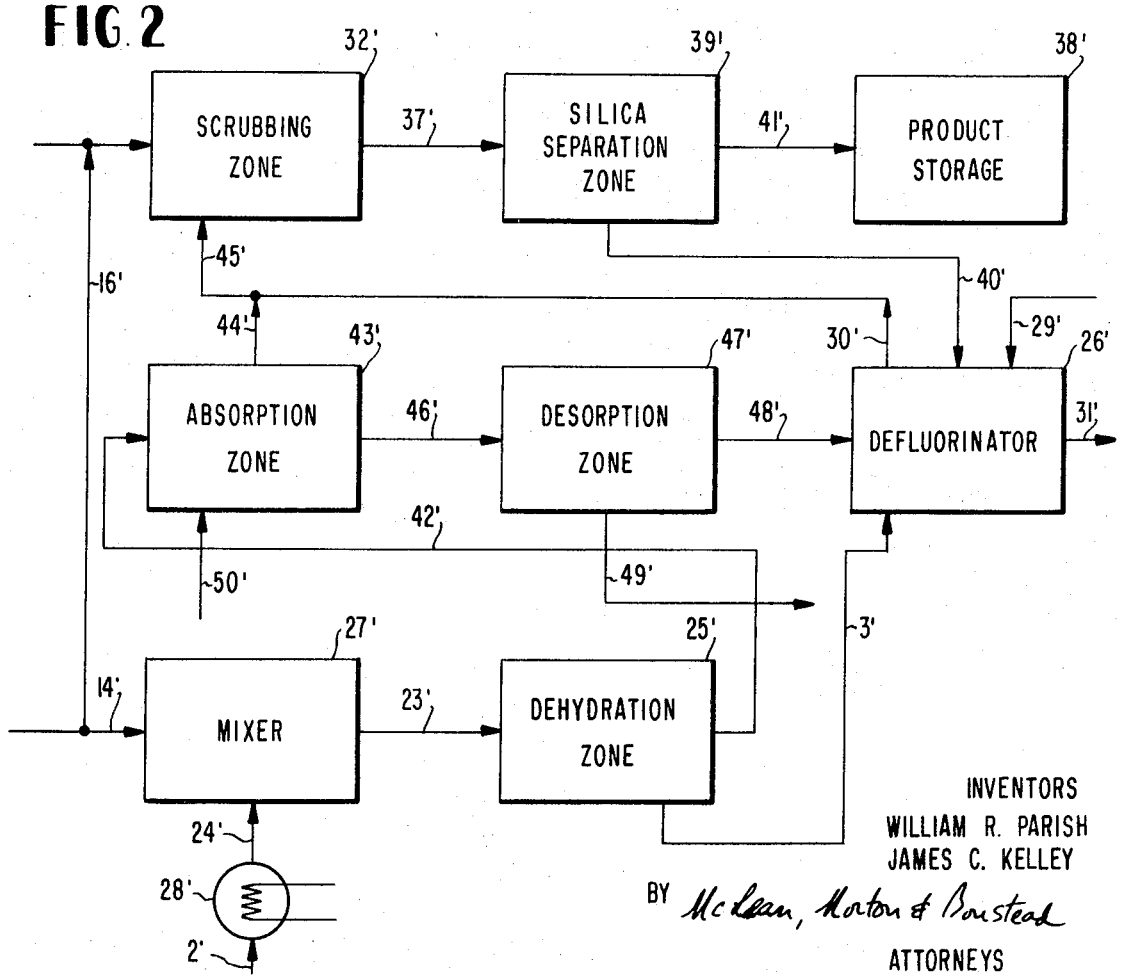

FIG. 2 illustrates an alternative embodiment of this invention in which HF is also recovered as a product. Fluosilicic acid, at a temperature of about 90° to 240° F. and a concentration of from about 10 to 30 weight percent $H_2SiF_6$, is carried in line 14' to mixing tee 27' where it is combined with 85 to 100 percent strength sulfuric acid introduced via line 2', heater 28' and line 24', also at a temperature of from about 90° to 240° F. The weight ratio (anhydrous) of sulfuric acid to fluosilicic acid in the mixture is from about 5:1 to 30:1. The mixture of acids is conducted via line 23' under about 5 to 15 p.s.i.g. pressure to the dehydrator 25' which can be a falling film type of evaporator. Residence time in line 23' is about 5 seconds and the mixture enters the evaporator at about 250° to 300° F., which is approximately the temperature of the liquid in the evaporator. $SiF_4$ and HF gases flash off at these temperatures and under the approximately atmospheric pressure conditions maintained in the evaporator and are removed via line 42'. Dilute sulfuric acid (about 80 to 85 weight percent concentration) is withdrawn as bottoms via line 3'. Residence time of the reactants in the evaporator is about 2 to 5 minutes.

The $SiF_4$ and HF gases in line 42' are introduced into absorption zone 43' where they are contacted with liquid sulfuric acid of a concentration of about 93 to 99 percent $H_2SO_4$ introduced via line 50' at a temperature of up to about 120° F. The absorption zone 43' can be any suitable gas-liquid contact apparatus and preferably is a spray tower, buttle-capped column, sieve-tray tower, packed tower, etc., in which the mixed gases pass upwardly through a descending stream of the concentrated sulfuric acid. The HF component of the mixed gases is absorbed in the concentrated sulfuric acid. The HF-containing sulfuric acid is passed via line 46' to desorption zone 47' where the HF is separated from the concentrated $H_2SO_4$. In the desorption zone 47', the HF-containing sulfuric acid can be heated to a temperature sufficient to liberate the HF but below the boiling point of the solution. At atmospheric pressure, a temperature of from about 200° to 300° F. is suitable. The HF recovered from desorption zone 47' is usually about 98 to 99 percent pure and can be conducted via line 49' to a HF recovery zone (not shown). The HF-depleted $H_2SO_4$ can be conveyed from desorption zone 47' via line 48' to spent acid hold tank 26' where it is mixed with the dilute sulfuric acid bottoms introduced via line 3' from the dehydration zone 25'. The sulfuric acid in tank 26' can be treated with silica in the same manner as in the embodiment of FIG. 1. Silica is introduced via line 29' and also can be introduced via line 40' from silica separation zone 39'. The dilute-silica-treated sulfuric acid of a concentration of about 70 to 75 percent can be removed through line 31' for ultimate recovery. The $SiF_4$ produced in tank 26' is removed through line 30', mixed with the $SiF_4$ removed from the absorber 43' via line 44' and conveyed via line 45' to scrubbing zone 32' for the concentration of fluosilicic acid in the same manner as the embodiment of FIG. 1.

The fluosilicic acid wash liquid to scrubbing zone 32' is preferably of the same composition as the dilute fluosilicic acid feedstock 14' and can be taken off line 14' through line 16'. The concentrated fluosilicic acid solution product can be conveyed via line 37' to silica separation zone 39' for separation of silica in the same manner as in the embodiment of FIG. 1. The silica-depleted concentrated fluosilicic acid product is then conveyed via line 41' to product storage tank 38'.

The concentration process of this invention is advantageous for integrated use in the preparation of superphosphate fertilizers. For instance, the diluted fluosilicic acid solutions useful herein as feeds may be the byproducts of the preparation of such fertilizers, while the sulfuric acid bottoms, after removal of hydrogen fluoride, are of such concentration that they are directly usable in the preparation of phosphoric acid, of which substantial portions of the total yearly production are used in the preparation of superphosphate fertilizers.

Also, the fluosilicic acid concentrate of this invention is of such concentrations that considerable savings in transportation costs are achieved. For instance, by increasing the concentration of fluosilicic acid from 25 to 50 percent by weight in commercial grades of fluosilicic acid solutions, substantial reductions in the water content are achieved. As a result of these reductions, the transportation cost per pound of fluorine can be reduced by about 50 percent. This reduction in transportation costs per pound of fluorine is significant in light of the large amounts of fluosilicic acid solutions used today in the fluoridation of water supplies.

The concentrated fluosilicic acid solutions produced by the process of this invention are also advantageous for direct use in the preparation of anhydrous hydrogen fluoride and can be used, for example, as the feedstock in the HF-producing process disclosed in copending application, Ser. No. 816,229, filed Apr. 15, 1969, in the names of William R. Parish, James C. Kelley, Albert Giovanetti and William A. Lutz.

The following example serves to describe preferred procedures for accomplishing the concentration process of this invention.

EXAMPLE I

The process flow for this example is illustrated by FIG. 1. By this embodiment of the invention, substantially pure (i.e., the precipitated silica has been removed), concentrated fluosilicic acid is prepared. The process conditions are as follows:

| | | Weight Percent |
|---|---|---|
| 1. Feed: | | |
| 25% $H_2SiF_6$ | $SiF_4$ | 8.70 |
| | HF | 18.31 |
| | $H_2O$ | 72.99 |
| 98% $H_2SO_4$ | $H_2SO_4$ | 97.9 |
| | $H_2O$ | 2.1 |
| 2. Fluosilicic Acid Temperature prior to mixing, tc | | 90° F. |
| 3. Sulfuric Acid temperature prior to mixing, | | 90° F. |
| 4. Separation zone temperature | | 220° F. |
| 5. $H_2SO_4$ concentration of spent acid from the separation zone. | | 80% |
| 6. $H_2SO_4$ concentration of spent acid from silica treatment | | 70% |
| 7. Scrubbing liquid temperature in the scrubbing zone | | 100°–120° F. |
| 8. Concentration of $H_2SiF_6$ in product | | 40–50% |
| 9. Product temperature | | 90°–100° F. |

EXAMPLE II

The process flow for this example is illustrated by FIG. II. By this embodiment of the invention, both concentrated fluosilicic acid and hydrogen fluoride are products. The process conditions are as follows:

| | | Weight Percent |
|---|---|---|
| 1. Feed: | | |
| 25% $H_2SiF_6$ | $SiF_4$ | 8.70 |
| | HF | 18.31 |
| | $H_2O$ | 72.99 |
| 98% $H_2SO_4$ | $H_2SO_4$ | 97.9 |
| | $H_2O$ | 2.1 |
| 2. prior Fluosilicic acid temperature prior to mixing. | | 228° F. |
| 3. Sulfuric acid temperature prior to mixing, | | 210° F. |
| 4. Separation zone temperature | | 280°–300° F. |
| 5. $H_2SO_4$ concentration from spent acid from the separation zone | | 80–85% |
| 6. $H_2SO_4$ concentration of spent acid from hold tank after silica treatment | | 70–75% |
| 7. Scrubbing liquid temperature in the scrubbing zone | | 100°–120° F. |
| 8. Concentration of $H_2SiF_6$ in product | | 40–50% |
| 9. Product temperature | | 90°–100° F. |

EXAMPLE III

The process flow for this example is illustrated by FIG. 1. By this embodiment of the invention, the separated silica is washed with weak fluosilicic acid which is then conveyed to the initial scrubbing zone. The process conditions are substantially identical to those in Example I.

EXAMPLE IV

The process flow for this example is also illustrated by FIG. 1. In this embodiment of the invention, the silica separation zone is eliminated by allowing sufficient hydrogen fluoride content to be present in the gaseous overhead from the separation zone to react with and consume the silica produced in the scrubbing zone. The process conditions are as follows:

| | | Weight Percent |
|---|---|---|
| 1. Feed: | | |
| 25% $H_2SiF_6$ | $SiF_4$ | 8.70 |
| | HF | 18.31 |
| | $H_2O$ | 72.99 |
| 98% $H_2SO_4$ | $H_2SO_4$ | 97.9 |
| | $H_2O$ | 2.1 |
| 2. Fluosilicic acid temperature prior to mixing | | 228° F. |
| 3. Sulfuric acid temperature prior to mixing | | 210° F. |
| 4. Separation zone temperature | | 300° F. |
| 5. $H_2SO_4$ concentration from spent acid from the separation zone | | 80–85% the |
| 6. $H_2SO_4$ concentration from the hold tank after silica treatment | | 80% |
| 7. Scrubbing liquid temperature in scrubbing zone | | 100°–120° F. |
| 8. Concentration of $H_2SiF_6$ in product | | 40–50% |
| 9. Product temperature | | 90°–100° F. |

It is claimed:

1. A process for concentrating a dilute, aqueous fluosilicic acid solution which contains about 10 to 30 weight percent $H_2SiF_6$, which process comprises:
   i. mixing sulfuric acid having a concentration of above about 85 weight percent with a first portion of said dilute fluosilicic acid solution to effect dehydration of the fluosilicic acid and dilution of the sulfuric acid, said mixing being effected under superatmospheric pressure for a time sufficient to allow substantially complete mixing of the acids, said pressure being sufficient to prevent the water in the mixture from evaporating to react with the silicic component evolving from the mixture which can result in the production of a substantial amount of silica;
   ii. introducing the mixture into a reduced pressure separation zone whereby silicon tetrafluoride is evolved and removed from the zone as a gaseous overhead and dilute sulfuric acid is withdrawn from the zone at bottoms;
   iii. scrubbing said silicon tetrafluoride gaseous overhead of (ii) with a second portion of said dilute, aqueous fluosilicic acid solution in a scrubbing zone to effect reaction between said silicon tetrafluoride and the water of the fluosilicic acid scrubbing solution to form, as a spent scrubbing solution, a more concentrated, aqueous fluosilicic acid solution; and
   iv. recovering the concentrated, aqueous fluosilicic acid solution from the scrubbing zone.

2. The process of claim 1 wherein the temperature of the separation zone is about 200° to 250° F., the hydrogen fluoride formed by the dehydration of fluosilicic acid remains in solution with the dilute sulfuric acid and the hydrogen-fluoride-containing, dilute sulfuric acid bottoms are treated in a dehydrofluorination zone with a siliceous material to release the hydrogen fluoride therein as a silicon-tetrafluoride-containing gaseous overhead, while maintaining the dehydrofluorination zone temperature at less than the boiling point of the sulfuric acid solution therein.

3. The process of claim 2 wherein the silicon-tetrafluoride-containing gaseous overhead from the dehydrofluorination zone is conducted to the scrubbing zone to effect reaction between the said silicon tetrafluoride and the water of the fluosilicic acid scrubbing solution to form concentrated, aqueous fluosilicic acid solution.

4. The process of claim 1 wherein the sulfuric acid is mixed with the fluosilicic acid in step (i) in an anhydrous weight ratio of sulfuric acid to fluosilicic acid of about 5 to 30:1, sufficient to provide the dilute sulfuric acid bottoms with at least about 65 percent sulfuric acid, based on the combined weight of sulfuric acid and water therein.

5. The process of claim 4 wherein in step (i), prior to the mixing, the sulfuric acid and fluosilicic acid are at a temperature of about 90° to 240° F.

6. The process of claim 1 wherein the temperature of the separation zone is about 250° to 300° F., the hydrogen fluoride formed by the dehydration of fluosilicic acid is also evolved as a gaseous overhead and the mixed gaseous overhead, containing silicon tetrafluoride and hydrogen fluoride from the separation zone, is contacted with liquid sulfuric acid having a concentration of about 93 to 99 weight percent sulfuric acid at a temperature of up to about 120° F. in a hydrogen fluoride absorption zone to selectively absorb the hydrogen fluoride in the sulfuric acid prior to conducting said silicon-tetrafluoridecontaining gaseous overhead to the scrubbing zone of step (iii).

7. The process of claim 6 wherein the hydrogen fluoride in the spent sulfuric acid from the hydrogen fluoride absorption zone is liberated from the spent acid and recovered in substantially pure form by heating the spent acid in a desorption zone to a temperature below the boiling point of the spent acid.

8. The process of claim 1 wherein any precipitated silica formed in the scrubbing zone is separated from the concentrated fluosilicic acid product solution in a silica separation zone.

9. The process of claim 2 wherein any precipitated silica formed in the scrubbing zone is separated from the concentrated fluosilicic acid product solution in a silica separation zone.

10. The process of claim 9 wherein the separated silica from the silica separation zone is at least part of the siliceous material added to the hydrogen-fluoride-containing, dilute sulfuric acid bottoms to release the hydrogen fluoride as silicon tetrafluoride.

11. The process of claim 10 wherein the separated silica is washed with dilute, aqueous fluosilicic acid solution having a concentration of about 10 to 30 weight percent $H_2SiF_6$ before addition to the hudrogen-fluoride-containing, fluoride-containing, dilute sulfuric acid bottoms.

12. The process of claim 1 wherein sufficient hydrogen fluoride is present in the scrubbing zone to provide a substantially silica-free, concentrated, aqueous fluosilicic acid product solution.

13. The process of claim 1 wherein the pressure in step (i) is at least about 5 pounds per square inch gauge.

14. The process of claim 1 wherein the sulfuric acid employed in step (i) has a concentration of above about 90 weight percent sulfuric acid.

15. The process of claim 1 wherein, in step (i), the mixing under superatmospheric pressure is conducted for a time sufficient to allow the temperature of the mixture to reach at least about the temperature of the liquid in the reduced pressure separation zone.

16. The process of claim 1 wherein the sulfuric acid is mixed with the fluosilicic acid of step (i) in an anhydrous weight ratio of about 5 to 30:1, sufficient to provide the dilute sulfuric acid in step (ii) with about 70 percent sulfuric acid, based on the combined weight of sulfuric acid and water.

17. The process of claim 1 wherein the pressure maintained in step (ii) is at least about 10 pounds per square inch gauge.

18. The process of claim 1 wherein, in step (ii), the mixing under superatmospheric pressure is conducted for about 0.1 to 10 seconds.

19. The process of claim 1 wherein the mixture in the separation zone in step (ii) is sufficiently dispersed that it has at least about 1 square centimeter of liquid-gas interface per cubic centimeter of liquid.

20. The process of claim 19 wherein, in step (ii), the mixture has a residence time in the separation zone of about 0.1 to 80 minutes.

21. The process of claim 1 wherein, in step (ii), the mixture has a residence time in the separation zone of about 0.5 to 5 minutes and is sufficiently dispersed in the zone such that it has at least about 20 square centimeters of liquid-gas interface per cubic centimeter of liquid.

* * * * *

UNITED STATES PATENT OFFICE
CERTIFICATE OF CORRECTION

Patent No. 3,645,678          Dated February 29, 1972

Inventor(s) William R. Parish and James C. Kelley

It is certified that error appears in the above-identified patent and that said Letters Patent are hereby corrected as shown below:

Column 1, line 3, "U.S. Ser. No. 812,229" should read --U.S. Ser. No. 816,229--.
Column 1, line 35, "about about 350°F." should read --above about 350°F.--.
Column 6, line 11, "buttle-capped" should read --bubble-capped--.
Column 7, line 41, "prior Fluosilicic acid temperature" should read --Fluosilicic acid temperature--.
Column 8, line 6, "80-85% the" should read --80-85%--.

Signed and sealed this 4th day of July 1972.

(SEAL)
Attest:

EDWARD M. FLETCHER, JR.
Attesting Officer

ROBERT GOTTSCHALK
Commissioner of Patents